United States Patent
Sloot

(10) Patent No.: US 6,807,680 B2
(45) Date of Patent: Oct. 26, 2004

(54) ADJUSTABLE BAND TO BE WORN BY A PERSON OR ANIMAL

(75) Inventor: Alexander Sloot, Sugarloaf, PA (US)

(73) Assignee: Printmark Industries, Inc., Hazleton, PA (US)

( * ) Notice: Subject to any disclaimer, the term of this patent is extended or adjusted under 35 U.S.C. 154(b) by 181 days.

(21) Appl. No.: 10/100,889

(22) Filed: Mar. 19, 2002

(65) Prior Publication Data

US 2003/0177561 A1 Sep. 25, 2003

(51) Int. Cl.[7] ............................................. A41D 13/08
(52) U.S. Cl. ............................ 2/16; 2/170; 119/857
(58) Field of Search .......................... 2/339, 340, 341, 2/342, 312, 910, 16, 22, 170, 162, 183, 311, 321, 338, 318, 911, 10, 421, 246; 119/725, 729, 769, 801, 802, 857, 856, 863, 864, 865; D30/152, 151; 602/5, 4; 482/49, 105; 24/20 EE, 23 EE, 265 WS, 197, 9; 63/21, 6; 604/179; 40/633, 304, 300

(56) References Cited

U.S. PATENT DOCUMENTS

| | | | | |
|---|---|---|---|---|
| 923,217 A | * | 6/1909 | Tyrrell | 602/64 |
| 1,427,891 A | * | 9/1922 | Ziegler | 40/633 |
| 2,369,115 A | * | 2/1945 | Bloom | 2/16 |
| 3,877,426 A | * | 4/1975 | Nirschl | 602/62 |
| 4,091,766 A | * | 5/1978 | Colliard | 359/518 |
| 4,135,653 A | | 1/1979 | Sieloff | |
| 4,141,322 A | * | 2/1979 | Evans et al. | 119/654 |
| 4,246,101 A | | 1/1981 | Selby, III | |
| 4,472,839 A | * | 9/1984 | Johansen | 2/338 |
| 4,543,672 A | * | 10/1985 | Levy | 2/321 |
| 4,592,358 A | * | 6/1986 | Westplate | 607/112 |
| 4,799,923 A | * | 1/1989 | Campbell | 604/179 |
| 4,811,695 A | * | 3/1989 | Higgins | 119/864 |

(List continued on next page.)

Primary Examiner—Gary L. Welch
Assistant Examiner—Alissa L. Hoey
(74) Attorney, Agent, or Firm—St. Onge Stewarrd Johnston & Reens LLC.

(57) ABSTRACT

A band to be worn on the limb of a person or animal is provided. The band includes an outer member having an inner surface on which is provided one of a mating pair of fastening elements. A strap is attached to the outer member adjacent an end thereof, so as to define a space between the strap the inner surface of the outer member. An elongated inner member formed of a flexible elastic material is also provided. Attached to either end of the inner member are pieces of the other of the mating pair of fastening elements. One end of the inner member passes through the space defined between the strap and the inner surface of the outer member, and both ends thereof are detachably connected to the outer member via the mating pair of fastening elements.

16 Claims, 3 Drawing Sheets

U.S. PATENT DOCUMENTS

| | | | | |
|---|---|---|---|---|
| 4,829,604 A | * | 5/1989 | Allen et al. | 2/170 |
| 4,917,049 A | * | 4/1990 | Peterson | 119/864 |
| 4,966,322 A | * | 10/1990 | Zagorski et al. | 224/267 |
| 4,991,233 A | * | 2/1991 | Hall | 2/115 |
| 4,991,234 A | * | 2/1991 | Greenberg | 2/170 |
| 5,002,212 A | * | 3/1991 | Charleton | 224/221 |
| 5,031,576 A | * | 7/1991 | Weinberg | 119/865 |
| 5,052,055 A | * | 10/1991 | Mysliwiec | 2/48 |
| 5,343,562 A | * | 9/1994 | Bible | 2/16 |
| 5,352,209 A | * | 10/1994 | Bird et al. | 604/179 |
| 5,367,714 A | * | 11/1994 | Hines et al. | 2/311 |
| 5,390,928 A | * | 2/1995 | Salini | 473/205 |
| 5,584,076 A | * | 12/1996 | Armstrong | 2/195.2 |
| 5,758,671 A | | 6/1998 | Thim | |
| 5,865,148 A | * | 2/1999 | Aguirre et al. | 119/856 |
| 5,867,839 A | * | 2/1999 | Lawlor | 2/240 |
| 5,926,844 A | * | 7/1999 | Bear | 2/22 |
| 5,970,526 A | * | 10/1999 | Weathers | 2/321 |
| 6,049,905 A | * | 4/2000 | Owens | 2/16 |
| 6,077,241 A | * | 6/2000 | Fareed | 602/62 |
| 6,080,124 A | * | 6/2000 | Falk et al. | 602/26 |
| 6,081,925 A | * | 7/2000 | Reiber | 2/125 |
| 6,085,449 A | * | 7/2000 | Tsui | 40/1.6 |
| 6,094,749 A | * | 8/2000 | Proctor | 2/195.2 |
| 6,108,876 A | * | 8/2000 | Hubbert | 24/265 WS |
| 6,158,057 A | * | 12/2000 | Neumann | 2/312 |
| 6,173,451 B1 | * | 1/2001 | DeVincenzi | 2/162 |
| 6,199,208 B1 | * | 3/2001 | Torbett | 2/16 |
| 6,199,730 B1 | * | 3/2001 | Chisolm | 224/164 |
| 6,308,663 B1 | * | 10/2001 | Philen et al. | 119/864 |
| 6,360,684 B1 | * | 3/2002 | Quaglia | 116/222 |
| 6,553,944 B1 | * | 4/2003 | Allen et al. | 119/769 |
| 2002/0108162 A1 | * | 8/2002 | Bolds-Leftridge | 2/49.1 |

* cited by examiner

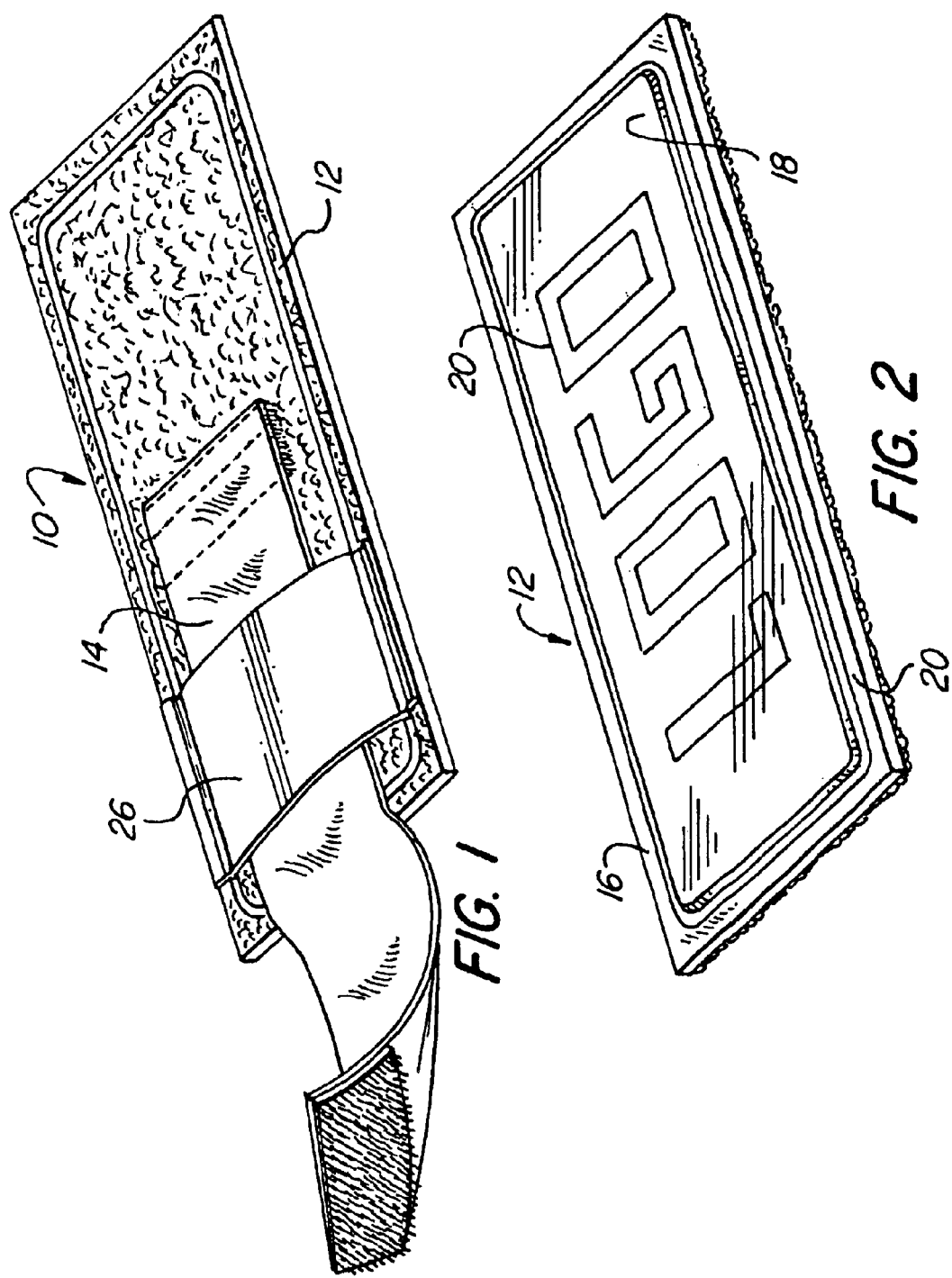

ADJUSTABLE BAND TO BE WORN BY A PERSON OR ANIMAL

FIELD OF THE INVENTION

The present invention relates to a band to be worn by a person or animal for identification and/or safety purposes, for providing resistance during exercise, for containing articles, or for the like, and more particularly, to such a band which may be quickly and easily adjusted for use on limbs having various dimensions, and for use by wearers of various sizes.

BACKGROUND OF THE INVENTION

Bands which are worn on the limb of a person or animal are well known. Most common is the use of such bands on the arm—"armbands." Such armbands have long been used for a myriad of applications as an effective and efficient means of identifying the wearer, making the wearer more visible in certain conditions, providing resistance for exercise, containing articles, and the like. However, although the prior art is developed, certain deficiencies in this general area exist.

One of the earliest and most simple types of armbands is created by tying a piece of cloth around the arm of the wearer. The color of the cloth helps to distinguish the wearer from others. One well known use for such armbands is in the area of recreational sports, where one team may wear armbands having one color and the other team may wear armbands having another color so that the players on each team are distinguishable from each other during play. However, this type of armband suffers from a number of disadvantages. One such disadvantage is that such armbands are difficult to don without the help of others—tying a piece of cloth on one's own arm is difficult to accomplish, since the hand of the arm onto which the cloth is being tied cannot be used. This is particularly true when the armband is being tied to the upper arm. Another disadvantage is that these types of armbands do not satisfactorily stay in position on the wearer's arm. This is true because such armbands do not provide any significant tension on the wearer's arm to resist slipping. For example, an armband tied to a person's upper arm may gradually slide down toward the elbow, and eventually down to the wrist. The wearer would disadvantageously be required to keep pulling the armband back up into the proper position.

U.S. Pat. No. 5,758,671 to Thim attempts to obviate the deficiencies of the above-described armband by providing a band which includes an annular, flexible sleeve of cloth in which is provided a central annular pocket between outer portions. An annular flat elastic band is captured in the pocket with its wide dimension generally perpendicular to the radius of the band and sleeve but is allowed to move in the pocket. However, this design suffers from disadvantages of its own. One such disadvantage is that the band may not fit all wearers. The maximum size of the band is limited by the size of the cloth sleeve and by the capacity of the elastic band to stretch without breaking, and the minimum size of the band is limited by the size of the elastic band in the contracted state. Thus, if the band were dimensioned to fit a small child's wrist, it would likely not be able to stretch sufficiently to fit the thigh of a large adult. Conversely, if the band were dimensioned to fit the thigh of a large adult, the elastic would likely not be able to contract sufficiently to fit the wrist of a small child. Moreover, it may be undesirable in certain circumstances to have the cloth sleeve gathered into undulations or ruffles while in the contracted state, as such may interfere with the wearer.

U.S. Pat. No. 4,135,653 to Sieloff discloses an armband assembly adapted to be transportively worn about a person's arm for carrying a portable radio. The armband assembly includes a first strap assembly for retainably encircling the person's arm to be transportively carried thereon and a second assembly fixedly secured to the first strap assembly for at least partially enclosing the radio so as to retainably mount the radio. The first strap assembly includes mating portions of a hook-and-loop fastening system at either end thereof, and may include a band of elastic-like stretch material. However, while this design may provide some degree of adjustability, that adjustability may not be sufficient to accommodate the various limbs of persons or animals of varying sizes. What would be desirable is some mechanism for providing a further degree of adjustability.

U.S. Pat. No. 4,247,101 to Gallmeyer discloses a weighted armband having pair of buckles are fixed in spaced relation to the band along one end thereof, and a pair of flexible straps extending in spaced-apart, generally parallel relation outwardly from the opposite end of the band. Each of the straps is provided with a portion of a hook-and-loop fastener on the outer surface thereof, and a pair of mating hook-and-loop fasteners is provided on the outer surface of the band. When the device is worn each of the straps extends from the end of the band laterally along the surface of the person's arm, extends through a corresponding one of the buckles, and then is returned back past the end of the band to be in mating engagement with the fastener on the band. However, like U.S. Pat. No. 4,135,653 to Sieloff, while this design may provide some degree of adjustability, that adjustability may not be sufficient to accommodate the various limbs of persons or animals of varying sizes. Moreover, this design is disadvantageously complex, in that it requires, among other things, buckles which must be stitched into the band, and as such is relatively expensive to produce.

What is desired, therefore, is a band to be worn by a person or animal for identification and/or safety purposes, for providing resistance during exercise, for containing articles, or for the like, which is relatively easy to don without the help of others, which stays securely in position on the wearer's limb, which is adjustable so as to fit the limbs of substantially all potential wearers, which does not interfere with the wearer while being worn, and which is relatively simple in design and inexpensive to produce.

SUMMARY OF THE INVENTION

Accordingly, it is an object of the present invention to provide a band to be worn by a person or animal for identification and/or safety purposes, for providing resistance during exercise, for containing articles, or for the like which is relatively easy to don without the help of others.

Another object of the present invention is to provide a band having the above characteristics and which stays securely in position on the wearer's limb.

A further object of the present invention is to provide a band having the above characteristics and which is adjustable so as to fit the limbs of substantially all potential wearers.

Still another object of the present invention is to provide a band having the above characteristics and which does not interfere with the wearer while being worn.

Yet a further object of the present invention is to provide a band having the above characteristics and which is relatively simple in design and inexpensive to produce.

These and other objects of the present invention are achieved by provision of a band to be worn on the limb of a person or animal. The band includes an outer member having a longitudinal axis and having a first longitudinal end and a second longitudinal end, and an inner surface on which is provided one of a mating pair of fastening elements. A strap is attached to the outer member adjacent to the first longitudinal end thereof, the strap having a longitudinal axis which is transverse to the longitudinal axis of the outer member. The strap is attached to the outer member at both longitudinal ends of the strap so as to define a space between the strap the inner surface of the outer member. An elongated inner member having a first end and a second end is also provided. The inner member is formed of a flexible elastic material and has an outer surface. Attached to the outer surface adjacent to the first end is a first piece of the other of the mating pair of fastening elements, and attached to the outer surface adjacent to the second end is a second piece of the other of the mating pair of fastening elements.

The first end of the inner member passes through the space defined between the strap and the inner surface of the outer member, and the first piece of the other of the mating pair of fastening elements attached to the inner member is detachably fastened to the one of a mating pair of fastening elements provided on the outer member. The second piece of the other of the mating pair of fastening elements attached to the inner member is detachably fastened adjacent to the second longitudinal end of the outer member to the one of a mating pair of fastening elements provided on the outer member. The band is adjustable to accommodate limbs of various sizes by adjusting the position along the inner surface of the outer member where the first end of the inner portion is detachably connected.

Preferably, the outer member comprises a fabric material, and has an outer surface to which is applied an appliqué. Most preferably, the appliqué is formed from a material selected from the group consisting of a reflective material, a glow-in-the-dark material, a non-reflective vinyl with a multi-color decoration, an embroidery, a direct screen print, a heat applied transfer, a fabric material, and combinations of these, and the appliqué includes a logo printed thereon or formed therein.

It is also preferable that the mating pair of fastening elements comprises a hook-and-loop fastening system. In this case, it is most preferable that the one of a mating pair of fastening elements provided on the outer member comprises the loop portion of the hook-and-loop fastening system, and the other of the mating pair of fastening elements attached to the inner member comprises the hook portion of the hook-and-loop fastening system.

The strap is preferably formed from a material selected from the group consisting of a vinyl material, a cloth material, and combinations of these, and the strap may include instructions printed thereon or formed therein. It is also preferable that inner members having varying lengths are interchangeable to provide further adjustability.

The invention and its particular features and advantages will become more apparent from the following detailed description considered with reference to the accompanying drawings.

BRIEF DESCRIPTION OF THE DRAWINGS

FIG. 1 is an isometric bottom view of a band in accordance with the present invention;

FIG. 2 is an isometric top view the outer member of the band illustrated in FIG. 1;

DETAILED DESCRIPTION OF AN EMBODIMENT OF THE INVENTION

Referring first to FIG. 1, a band 10 to be worn by a person or animal for identification and/or safety purposes, for providing resistance during exercise, for containing articles, or for the like, in accordance with the present invention is shown. The band 10 is designed to be worn on the limb of the person or animal, and may be worn, for example, on the upper arm, forearm, wrist, thigh, calf, ankle, etc. The band 10 includes an outer member 12 and an inner member 14. It should be understood that the term "outer" and "inner" used herein refer to the orientation in which it expected that a wearer will typically wear band 10—with outer member 12 facing away from the midline of the wearer's body and with inner member 14 facing toward the midline of the wearer's body. However, it should be understood that it is also contemplated that a wearer may wear band 10 with outer member 12 facing toward the midline of the wearer's body and with inner member 14 facing away from the midline of the wearer's body by simply rotating band 10 about the limb and without requiring a modification of the design of band 10.

Figure 3:
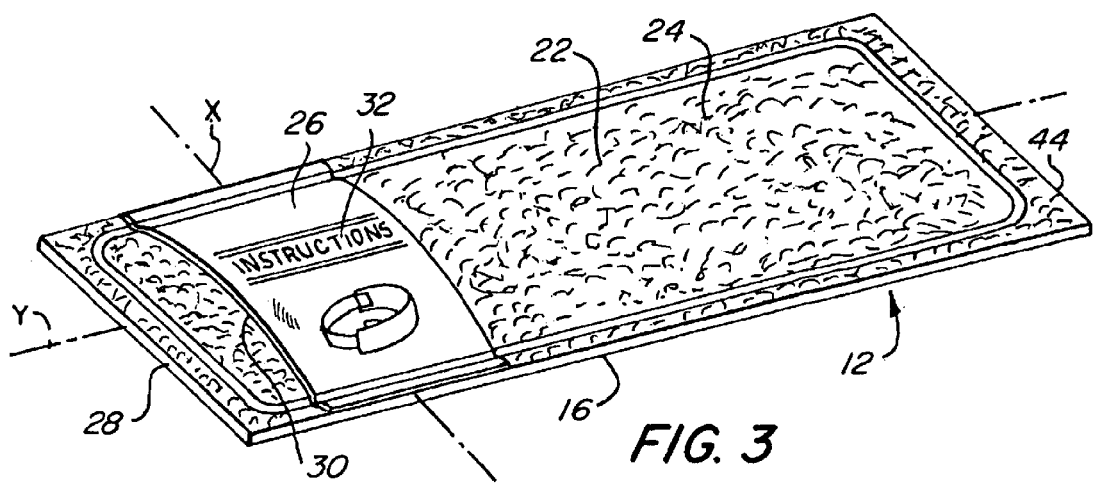
FIG. 3 is an isometric bottom view of the outer member of the band illustrated in FIG. 1.

Referring now to FIGS. 2 and 3, outer member 12 is shown in more detail. Outer member 12 is preferably formed from a layer of fabric material 16, although other materials may also be used. An appliqué 18 or the like may be applied to the outer surface 20 of outer member 12. Appliqué 18 may be formed of a reflective material, a glow-in-the-dark material, a non-reflective vinyl with a multi-color decoration, an embroidery, a direct screen print, a heat applied transfer, a fabric material, or combinations of these. Moreover, appliqué 18 may include a corporate logo 20 printed thereon or formed therein for promotional purposes. Of course, outer member 12 can be plain, with no appliqué 18 attached thereto. When used as a safety device, such as for use by joggers at night, a reflective and/or glow-in-the-dark material is most beneficial. In addition to, or instead of, the appliqué, various other attachments and/or pockets may be provided on outer member 12 to contain articles or to provide a means of attaching devices, such as weights, portable audio equipment or other articles.

The inner surface 22 of fabric material 16 of outer member 12 is provided with a portion 24 of a mating fastening system, such as a hook-and-loop fastening system. When a hook-and-loop fastening system is used, inner surface 22 is preferably, although not necessarily, provided with the loop portion to promote ease of manufacturing and reduction of manufacturing costs.

A strap 26 is attached to inner surface 22 of fabric material 16 of outer member 12 adjacent to one longitudinal edge 28 thereof such that the longitudinal axis X of strap 26 is transverse to the longitudinal axis Y of outer member 12. Strap 26 is attached to inner surface 22 at both ends of strap 26 so as to define a space 30 between strap 26 and the inner surface 22 of fabric material 16. Strap may be made of vinyl, cloth or some other material, and may have instructions 32 for use of the armband printed thereon. The function of strap 26 is described in more detail below with respect to FIG. 5.

Figure 4:
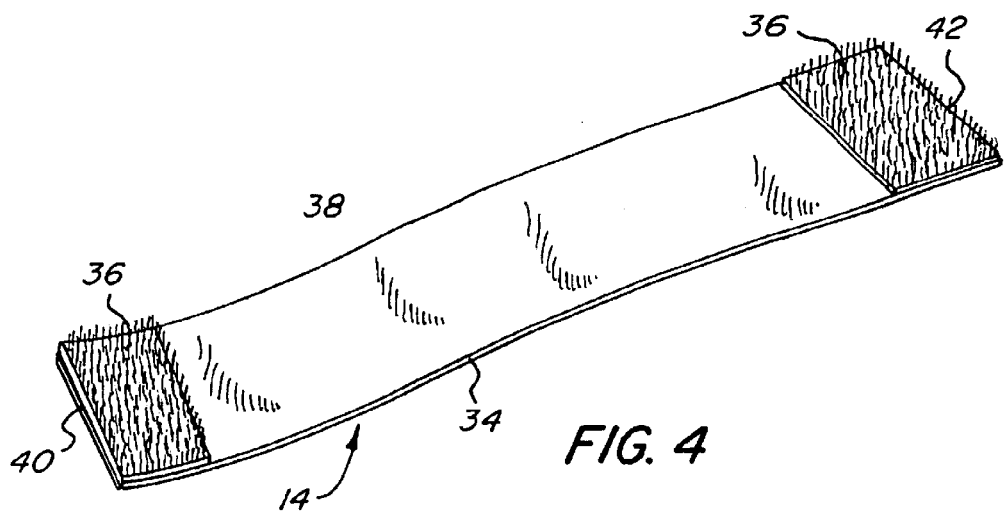
FIGS. 4A and 4B are isometric top views of embodiments of the inner member of the band illustrated in FIG. 1.

Referring now to FIG. 4A inner member 14 is shown in more detail. Inner member 14 is formed from a layer of elastic material 34, such as a stretch fabric. At each end of inner member 14, a portion 36 of a mating fastening system, such as a hook-and-loop fastening system, is attached to the outer surface 38 thereof by means of heat application, adhesives, sewing, ultrasonic welding, or the like. The portions 36 provided on inner member 14 are selected to cooperatively mate with the portion 24 provided on the inner surface 22 of outer member 12. Thus, if the inner surface 22 of outer member 12 is provided with the loop portion 24 of a hook-and-loop fastening system (as described above), the portions 36 attached to outer surface 38 of inner member 14 would comprise corresponding hook portions 36 of the hook-and-loop fastening system. The portions 36 may range in size from a fraction of an inch to several inches, so long as a fastening force sufficient to hold the inner member 14 and the outer member 12 together during use is created.

Figure 5:
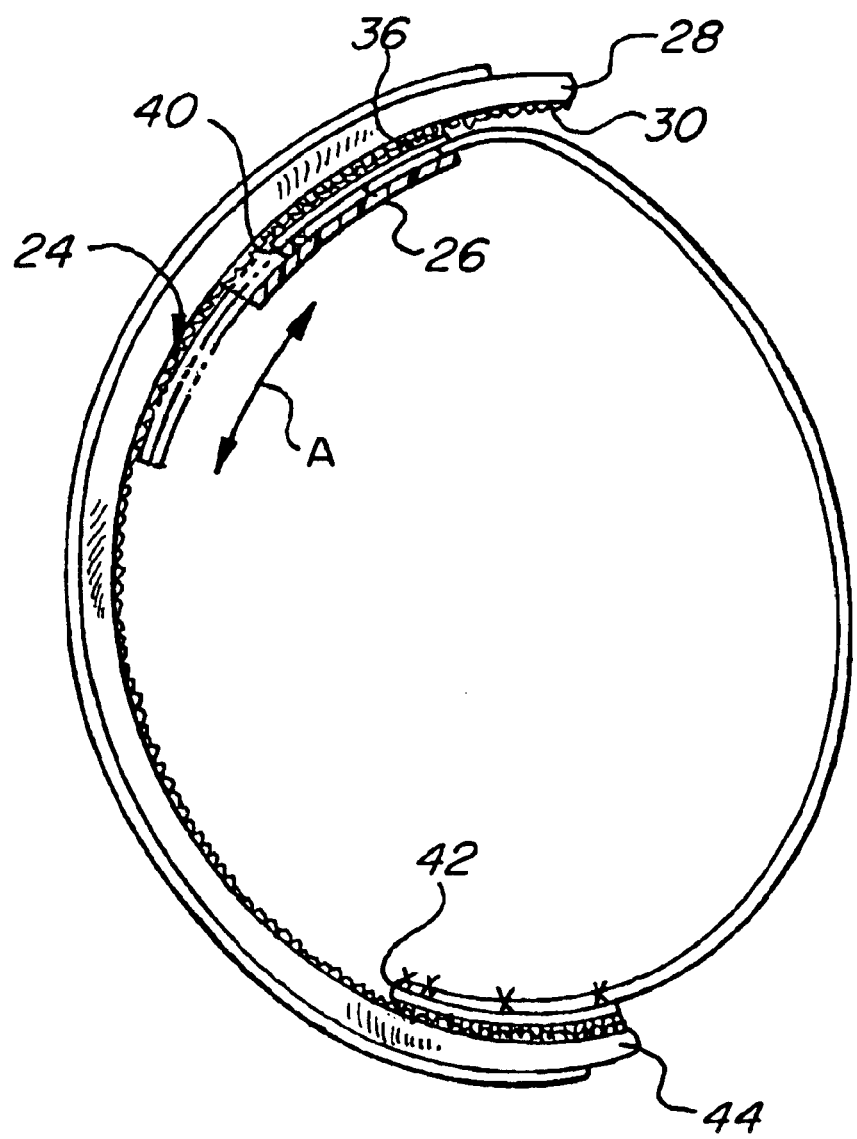
FIG. 5 is a side elevational view illustrating the adjustability of the band illustrated in FIG. 1.

Referring now to FIG. 5, the operation of band 10, and the adjustability thereof, are illustrated. A first end 40 of inner portion 14 is slid through the space 30 defined between strap 26 and the inner surface 22 of fabric material 16, and the portion 36 of the fastening system attached to the outer surface 38 of inner member 14 is fastened to the portion 24 of the fastening system attached to the inner surface 22 of outer member 12. The second end 42 of inner portion 14 is similarly attached to the end 44 of outer member 12 opposite the end 28 adjacent to which the strap 26 is attached by cooperation of the portion 36 of the fastening system attached to the outer surface 38 of inner member 14 with the portion 24 of the fastening system attached to the inner surface 22 of outer member 12.

Adjustment is conveniently made possible by simply moving the first end 40 of inner member 14 further up or down along outer member 12 (as shown in phantom and by arrow A in FIG. 5). Outer member 12 is kept close to the limb of the wearer at end 44 because inner member 14 is attached adjacent thereto. Moreover, outer portion 12 is kept close to the limb of the wearer at end 28 by cooperation of the inner member 14 through the strap 26 which is attached to outer member 12. Thus, the strap 26 allows the end 28 of outer member 12 to be kept close to the limb of the wearer even if the inner member 14 is adjusted such that the portion 36 attached to the first end 40 of the inner member is not located adjacent to the end 28 of outer member 28 (as shown in phantom in FIG. 5). This design assures that band 10 will not interfere with the wearer while it is being worn.

Thus, due to the adjustability features of band 10, it may be used to fit the various limbs of wearers of varying sizes. The elastic nature of the inner member 14 provides some adjustability and provides tension to keep the band 10 in place on the limb of the wearer. Moreover, the hook-and-loop fasteners, in cooperation with the strap 26, also provides a large degree of adjustability heretofore unknown in the art. Furthermore, to allow for even more adjustability, inner members 14 having varying lengths may be used without requiring any modifications to the outer member 12, which is the more complex part and which is more costly to produce. For example, inner member 14' shown in FIG. 4B is shorter than inner member 14 shown in FIG. 4A. Inner member 14 may be longer than, shorter than, or the same size as outer member 12, and inner members 14 of varying lengths are readily interchangeable.

The present invention, therefore, provides a band to be worn by a person or animal for identification and/or safety purposes, for providing resistance during exercise, for containing articles, or for the like which is relatively easy to don without the help of others, which stays securely in position on the wearer's limb, which is adjustable so as to fit the limbs of substantially all potential wearers, which does not interfere with the wearer while being worn, and which is relatively simple in design and inexpensive to produce.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A band to be worn on the limb of a person or animal, said band comprising:

an outer member formed of a fabric material having a longitudinal axis and having a first longitudinal end and a second longitudinal end, said outer member having an inner surface on which is provided the loop portion of a hook-and-loop fastening system and an outer surface on which is applied an appliqué;

a strap attached to said outer member adjacent to the first longitudinal end thereof, said strap having a longitudinal axis which is transverse to the longitudinal axis of said outer member, said strap being attached to said outer member at both longitudinal ends of said strap so as to define a space between said strap and the inner surface of said outer member;

an elongated inner member having a first end and a second end, said inner member being formed integrally in one piece of a flexible elastic material and having an outer surface, said inner member having attached to the outer surface thereof adjacent to the first end a first piece of the hook portion of a hook-and-loop fastening system, and having attached to the outer surface thereof adjacent to the second end a second piece of the hook portion of a hook-and-loop fastening system;

wherein the first end of said inner member passes through the space defined between said strap and the inner surface of said outer member, wherein the first piece of the hook portion of a hook-and-loop fastening system attached to said inner member is detachably fastened to the loop portion of a hook-and-loop fastening system provided on said outer member, and wherein the second piece of the hook portion of a hook-and-loop fastening system attached to said inner member is detachably fastened adjacent to the second longitudinal end of said outer member to the loop portion of a hook-and-loop fastening system provided on said outer member; and wherein said band is adjustable to accommodate limbs of various sizes by adjusting the position along the inner surface of said outer member where the first end of said inner portion is detachably connected.

2. The band of claim 1 wherein the appliqué is formed from a material selected from the group consisting of a reflective material, a glow-in-the-dark material, a non-reflective vinyl with a multi-color decoration, an embroidery, a direct screen print, a heat applied transfer, a fabric material, and combinations of these.

3. The band of claim 1 wherein the appliqué includes a logo printed thereon or formed therein.

4. The band of claim 1 wherein said strap is formed from a material selected from the group consisting of a vinyl material, a cloth material, and combinations of these.

5. The band of claim 1 wherein said strap includes instructions printed thereon or formed therein.

6. The band of claim 1 wherein said inner member is interchangeable with another inner member having a length different than a length of said inner member to provide further adjustability.

7. A band to be worn on the limb of a person or animal, said band comprising:

an outer member having a longitudinal axis and having a first longitudinal end and a second longitudinal end, said outer member having an inner surface on which is provided one of a mating pair of fastening elements;

a strap attached to said outer member adjacent to the first longitudinal end thereof, said strap having a longitudinal axis which is transverse to the longitudinal axis of said outer member, said strap being attached to said outer member at both longitudinal ends of said strap so as to define a space between said strap and the inner surface of said outer member;

an elongated inner member having a first end and a second end, said inner member being formed integrally in one piece of a flexible elastic material and having an outer surface, said inner member having attached to the outer surface thereof adjacent to the first end a first piece of the other of the mating pair of fastening elements, and having attached to the outer surface thereof adjacent to the second end a second piece of the other of the mating pair of fastening elements;

wherein the first end of said inner member passes through the space defined between said strap and the inner surface of said outer member, wherein the first piece of the other of the mating pair of fastening elements attached to said inner member is detachably fastened to the one of a mating pair of fastening elements provided on said outer member, and wherein the second piece of the other of the mating pair of fastening elements attached to said inner member is detachably fastened adjacent to the second longitudinal end of said outer member to the one of a mating pair of fastening elements provided on said outer member; and wherein said band is adjustable to accommodate limbs of various sizes by adjusting the position along the inner surface of said outer member where the first end of said inner portion is detachably connected.

8. The band of claim 7 wherein said outer member comprises a fabric material.

9. The band of claim 7 wherein said outer member has an outer surface, and further comprising an appliqué applied to the outer surface of said outer member.

10. The band of claim 9 wherein the appliqué is formed from a material selected from the group consisting of a reflective material, a glow-in-the-dark material, a non-reflective vinyl with a multi-color decoration, an embroidery, a direct screen print, a heat applied transfer, a fabric material, and combinations of these.

11. The band of claim 9 wherein the appliqué includes a logo printed thereon or formed therein.

12. The band of claim 7 wherein the mating pair of fastening elements comprises a hook-and-loop fastening system.

13. The band of claim 12 wherein the one of a mating pair of fastening elements provided on said outer member comprises the loop portion of the hook-and-loop fastening system, and wherein the other of the mating pair of fastening elements attached to said inner member comprises the hook portion of the hook-and-loop fastening system.

14. The band of claim 7 wherein said strap is formed from a material selected from the group consisting of a vinyl material, a cloth material, and combinations of these.

15. The band of claim 7 wherein said strap includes instructions printed thereon or formed therein.

16. The band of claim 7 wherein said inner member is interchangeable with another inner member having a length different than a length of said inner member to provide further adjustability.

* * * * *